March 29, 1927.

S. R. BERGMAN

ALTERNATING CURRENT MOTOR

Filed May 29, 1924

1,622,567

Inventor:
Sven R. Bergman,
by
His Attorney.

Patented Mar. 29, 1927.

1,622,567

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

ALTERNATING-CURRENT MOTOR.

Application filed May 29, 1924. Serial No. 716,780.

My invention relates to alternating current commutator motors, and has for its object the provision of an improved arrangement for facilitating the commutation of such motors at low speeds and under all conditions of operation.

It is well known that the commutation of an alternating current motor, whether of the series compensated or repulsion type, is unsatisfactory at low speeds of the motor. This is largely due to the fact that the alternating flux of the motor field produces in the armature coils short circuited by the brushes, heavy currents which cause the brushes to burn and spark as they pass from one commutator segment to another. The usual type of commutating pole is ineffective to cure this evil at low motor speeds and, for this reason, the use of the single phase commutator motor in railway work has not been altogether satisfactory. In accordance with my invention, this difficulty is largely avoided by the provision of a localized revolving field in the neutral zone of the motor for the purpose of inducing in the short circuited coils an electromotive force of such a direction and value as partially or entirely to neutralize that induced therein by the exciting flux of the motor.

My invention will be better understood on reference to the following description when considered in connection with the accompanying drawing and its scope will be pointed out in the appended claims.

Figure 1:
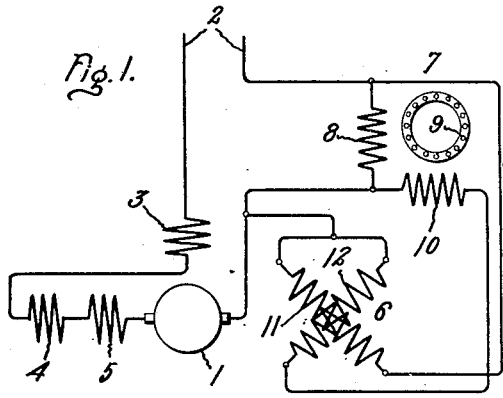
Figure 2:
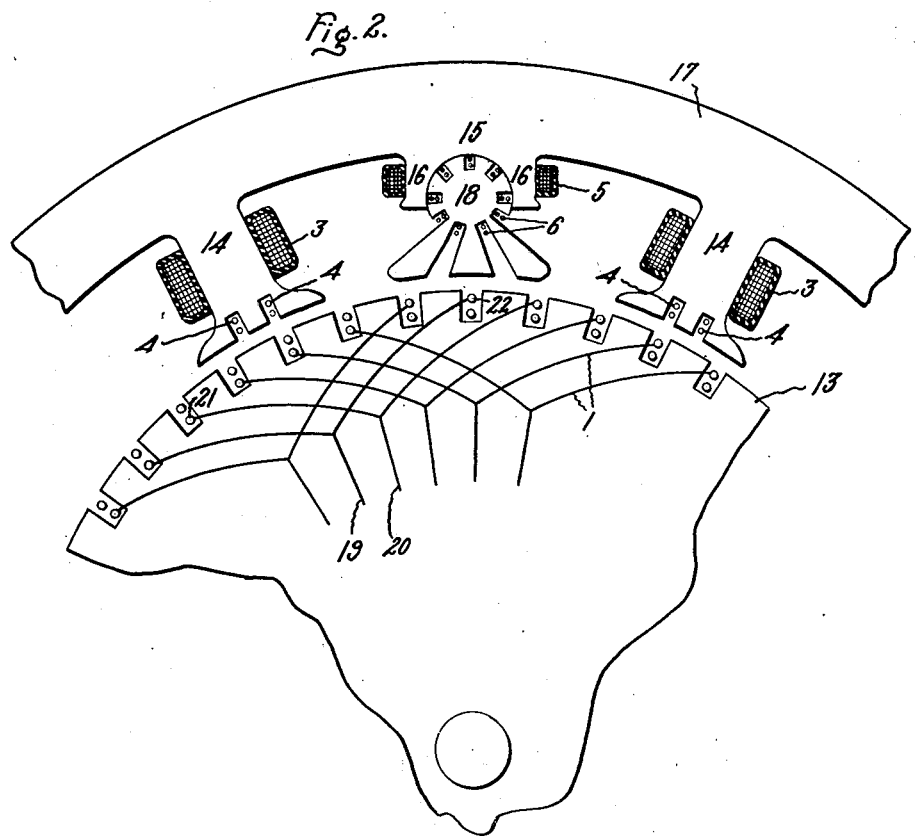

Referring to the drawing, Fig. 1 is a schematic diagram showing the connections of a motor in which my invention has been embodied; and Fig. 2 shows certain details in the structure of the motor illustrated by Fig. 1.

Fig. 1 shows a single phase commutator motor comprising an armature winding 1 arranged to be connected to the leads 2 through an exciting winding 3 for producing the main field of the motor, a compensating winding 4 for neutralizing the reaction of the armature winding 1, and single and polyphase commutating windings 5 and 6 for neutralizing the voltage which tends to be induced in the armature coil undergoing commutation by reason of its inductive relation with the main field winding 3. The functions performed by and the relations existing between the windings 1, 3, 4 and 5 are well known by those skilled in the art and will therefore be understood without detailed explanation. Current for operating the motor may be supplied through the leads 2 from any suitable source.

For the purpose of energizing the polyphase commutating winding 6 any well known form of phase converter may be employed. In order to explain my invention, the winding 6 has been shown as operatively associated with a phase converter 7 which comprises a primary winding 8 connected between one of the leads 2 and the armature winding 1, a secondary or rotor winding 9 of the squirrel cage type, and an auxiliary winding 10 in which current of a phase different from that supplied to the winding 8 is produced in a well known manner by the action of the secondary winding 9. The phase windings 11 and 12 of the polyphase commutating winding 6 are connected across the primary and auxiliary windings 8 and 10 respectively of the phase converter 7. It will now be apparent that the winding 6 will produce a rotating field when single phase current is supplied to the motor through the leads 2 and that the windings 1, 3, 4 and 5 will at the same time be supplied with single phase current.

Fig. 2 illustrates in a general way the relative arrangement of the various windings on the armature core 13, main pole cores 14 and commutating pole cores 15 of the motor. The arrangement of the armature winding 1, the exciting winding 3 and the compensating winding 4 is well known and need not be described in detail since they form no part of my invention. The single phase commutating winding 5 is likewise of the usual form except that it may be reduced in size or entirely omitted depending on whether the polyphase winding 6 is designed to produce a part or all of the neutralizing flux required for good commutation.

The core 15 of the commutating pole is shown as comprising projections 16 which extend inwardly from the yoke member 17 partially to surround and to support the integral core member 18 in the slots of which the polyphase winding 6 is wound. It will of course be understood that any suitable arrangement for producing a rotating field in the neutral zone of the motor may be used without losing the advantages of my invention.

In explaining the operation of my invention, it will be assumed that the commutator leads 19 and 20 are short circuited by a commutator brush. Under these conditions, the coil comprising armature conductors 21 and 22 is short circuited and inductively related with one of the main field windings 3. It will therefore act as the secondary of a transformer having a high ratio of transformation and will tend to carry a current of such magnitude as to cause sparking at the brush when it opens the connection between the commutator leads 19 and 20. If the motor is operating at low speed, this sparking will not be greatly minimized by the single phase commutating winding due to the fact that the flux produced by this winding is being cut at a low rate and therefore produces a comparatively low neutralizing voltage in the short circuited coil. The voltage produced in the short circuited coil by the polyphase commutating winding, however, does not depend upon the motor speed and is thus effective at low speeds to produce a neutralizing voltage which is effective to produce good commutation at all speeds of the motor.

I have explained my invention by illustrating and describing a certain specific embodiment thereof, but it will be readily understood by those skilled in the art that the arrangement of this embodiment may be modified in certain of its details. I, accordingly do not wish to be restricted to the particular arrangement disclosed herein by way of example for the purpose of setting forth my invention in accordance with the patent statutes. The terms of the appended claims are, therefore, not restricted to the precise arrangement disclosed, but are intended to cover all changes within the true spirit and scope of my invention.

What I claim as new and desire to secure by Letters Patent of the United States, is,—

1. A commutator type dynamo electric machine provided with commutating poles and polyphase exciting windings for each such pole embracing an integral magnetic core member thereof.

2. An electrodynamic machine wherein a plurality of armature winding coils are operably associated with a commutator and wherein a commutating pole is arranged to produce a neutralizing voltage in an armature coil undergoing commutation, comprising a polyphase exciting winding embracing an integral magnetic core member of said commutating pole to produce a neutralizing voltage in said coil.

3. An alternating current commutator motor wherein a plurality of armature winding coils are operably connected to a commutator and wherein a commutating pole is arranged to produce a neutralizing voltage in an armature coil undergoing commutation, comprising single and polyphase windings for exciting said commutating pole to produce a neutralizing voltage in said coil.

4. An arrangement of the class described comprising a single phase alternating current commutator motor including armature coils operably associated with a commutator and a commutating pole provided with a polyphase winding embracing an integral magnetic core member of said pole, and phase converting means for supplying current to said polyphase winding.

5. The method of reducing sparking at the brushes of a series alternating current commutator motor comprising a plurality of armature coils operably associated with a commutator and a commutating pole, which consists in exciting said commutating pole to establish single and polyphase alternating fluxes whereby a neutralizing voltage is produced in an armature coil undergoing commutation.

In witness whereof, I have hereunto set my hand this 27th day of May, 1924.

SVEN R. BERGMAN.